US008635158B1

(12) United States Patent  
Ledder et al.

(10) Patent No.: US 8,635,158 B1
(45) Date of Patent: Jan. 21, 2014

(54) STUDENT LOAN REPAYMENT SYSTEM

(71) Applicant: Ledder High Risk Capital Ventures, LP, Fredericksburg, TX (US)

(72) Inventors: Emily Ledder, Fredericksburg, TX (US); Mark S. Ledder, Fredericksburg, TX (US)

(73) Assignee: Ledder High Risk Capital Ventures, LP, Fredericksburg, TX (US)

( * ) Notice: Subject to any disclaimer, the term of this patent is extended or adjusted under 35 U.S.C. 154(b) by 0 days.

(21) Appl. No.: 13/791,784

(22) Filed: Mar. 8, 2013

Related U.S. Application Data

(63) Continuation-in-part of application No. 13/600,136, filed on Aug. 30, 2012, which is a continuation-in-part of application No. 13/439,610, filed on Apr. 4, 2012.

(60) Provisional application No. 61/471,588, filed on Apr. 4, 2011.

(51) Int. Cl.
*G06Q 40/00* (2012.01)
(52) U.S. Cl.
USPC ............... 705/42; 705/38; 705/4; 235/38
(58) Field of Classification Search
USPC .............. 705/14, 35, 38; 709/204; 370/352
See application file for complete search history.

(56) References Cited

U.S. PATENT DOCUMENTS

| | | | |
|---|---|---|---|
| 7,880,642 B2 | 2/2011 | Gueziec | |
| 8,055,564 B2 * | 11/2011 | Wehunt et al. | 705/35 |
| 8,090,656 B2 | 1/2012 | Solomon et al. | |
| 8,204,717 B2 | 6/2012 | McLaughlin et al. | |
| 2001/0049624 A1 * | 12/2001 | Uyama et al. | 705/14 |
| 2002/0015176 A1 * | 2/2002 | Takao et al. | 358/1.15 |
| 2002/0052782 A1 * | 5/2002 | Landesmann | 705/14 |
| 2002/0111863 A1 * | 8/2002 | Landesmann | 705/14 |
| 2002/0138170 A1 * | 9/2002 | Onyshkevych et al. | 700/130 |
| 2002/0161630 A1 * | 10/2002 | Kern et al. | 705/14 |
| 2003/0004816 A1 * | 1/2003 | Byers et al. | 705/26 |
| 2003/0018537 A1 * | 1/2003 | Tomita et al. | 705/26 |
| 2003/0018538 A1 * | 1/2003 | Tomita et al. | 705/26 |
| 2003/0023493 A1 * | 1/2003 | Ohashi et al. | 705/16 |
| 2003/0069808 A1 * | 4/2003 | Cardno | 705/26 |
| 2003/0120555 A1 * | 6/2003 | Kitagawa | 705/26 |
| 2003/0149665 A1 * | 8/2003 | Terada | 705/40 |
| 2004/0024850 A1 * | 2/2004 | Miyake | 709/219 |
| 2004/0044616 A1 * | 3/2004 | Salter | 705/38 |
| 2004/0111360 A1 * | 6/2004 | Albanese | 705/38 |
| 2004/0117249 A1 * | 6/2004 | Wang et al. | 705/14 |
| 2004/0138958 A1 * | 7/2004 | Watarai et al. | 705/26 |
| 2004/0249758 A1 * | 12/2004 | Sukeda et al. | 705/57 |

(Continued)

*Primary Examiner* — Chika Ojiaku
(74) *Attorney, Agent, or Firm* — Buskop Law Group, PC; Wendy Buskop

(57) ABSTRACT

A student loan repayment system for accumulating money using a client device, a computing cloud, and a network, wherein a cloud data storage contains computer instructions for presenting a student loan holder interface, creating a student profile, forming an account for accumulating money linked to another account, enabling the student loan holder to input goals, and enabling the student loan holder to make and receive deposits into the account for accumulating money. The deposits can include an amount of money selected by the student loan holder, an amount of money repaid by not purchasing a product or service, an amount of money repaid by purchasing a lower priced product or service, a similar product with a rebate, another promotional incentive for purchasing a product, or an amount of money associated with a non-monetary goal.

14 Claims, 9 Drawing Sheets

(56) References Cited

U.S. PATENT DOCUMENTS

| | | |
|---|---|---|
| 2006/0259358 A1* | 11/2006 | Robinson et al. ............... 705/14 |
| 2007/0198382 A1* | 8/2007 | Ferrari ........................... 705/35 |
| 2010/0138287 A1 | 6/2010 | Hoque |
| 2010/0138341 A1* | 6/2010 | Solomon et al. ................ 705/42 |
| 2011/0137794 A1 | 6/2011 | Ferrari et al. |
| 2012/0030091 A1* | 2/2012 | Hu et al. ........................ 705/38 |
| 2012/0072345 A1 | 3/2012 | Solomon et al. |
| 2012/0084177 A1* | 4/2012 | Tanaka et al. .............. 705/26.41 |
| 2012/0239569 A1 | 9/2012 | Solomon et al. |

* cited by examiner

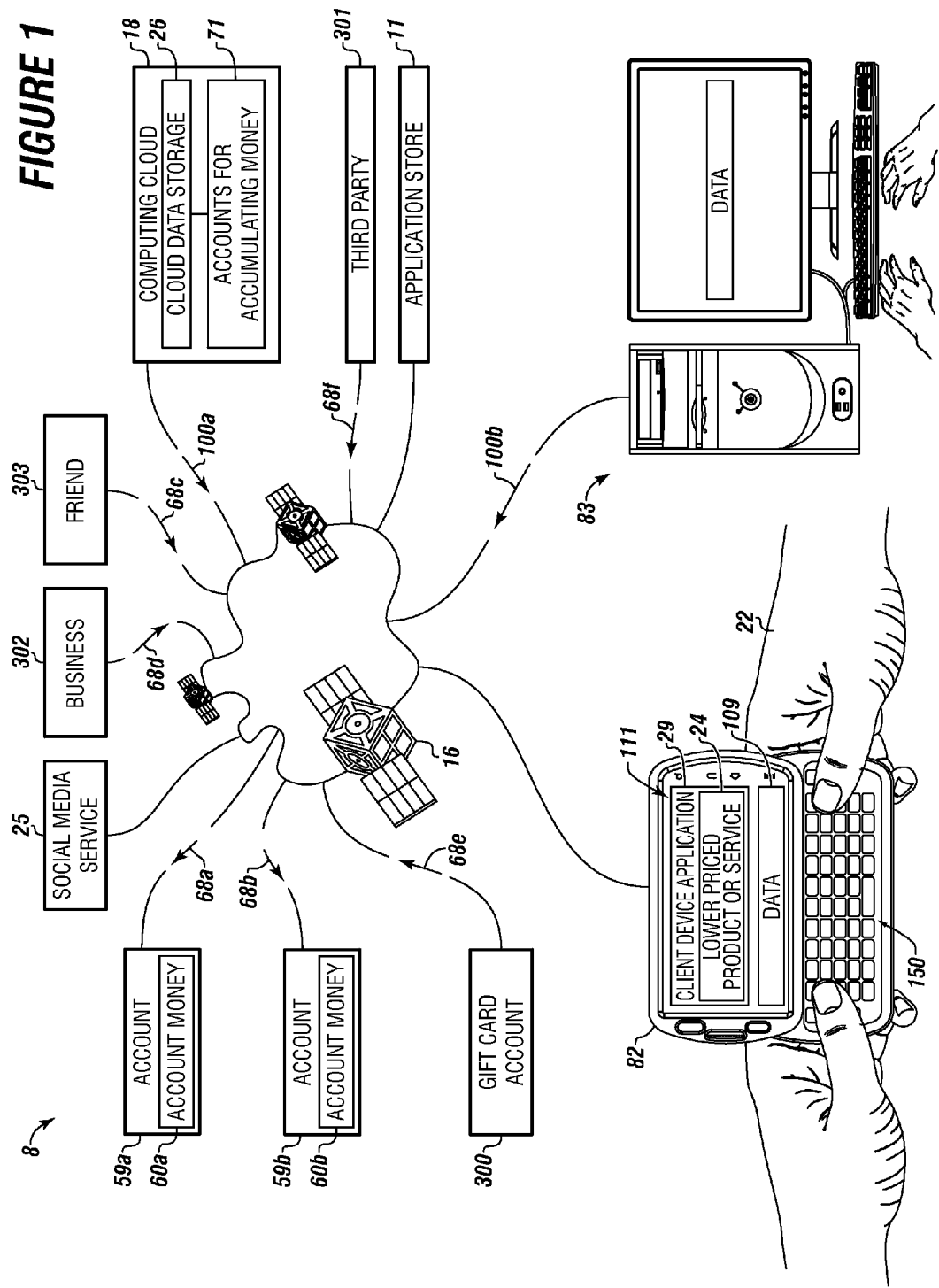

FIGURE 6

| | |
|---|---|
| STUDENT LOAN HOLDER INTERFACE | 111 |
| NOTICE | 31 |
| TOTAL AMOUNT OF MONEY ACCUMULATED TO DATE | 69 |
| RECORD | 70 |
| TIME AND DATE | 73 |
| COMPARISON | 105 |
| VECTOR BASED SCORE | 104 |
| RATE OF PROGRESS | 108 |
| OFFERS | 110 |
| ALARM | 101 |
| CELEBRATION INDICATOR | 102 |
| CELEBRATION SUGGESTIONS | 103 |
| AWARDS | 107 |

FIGURE 7

| | |
|---|---|
| CLOUD DATA STORAGE | 26 |
| STUDENT PROFILE | 28 |
| FINANCIAL INFORMATION | 54 |
| PURCHASING PATTERN | 79 |
| EDUCATIONAL INSTITUTION IDENTIFICATION NUMBER | 81 |
| PRESET LIMITS | 106 |
| INFORMATION ASSOCIATED WITH PURCHASES OF PRODUCTS OR SERVICES | 112 |
| NAME | 114 |
| SOCIAL SECURITY NUMBER | 115 |
| TAX IDENTIFICATION NUMBER | 116 |
| ADDRESS | 117 |
| PHONE NUMBER | 118 |
| EMAIL ADDRESS | 119 |
| SECURITY QUESTION | 120 |
| SECURITY QUESTION ANSWER | 121 |
| LIBRARY OF AGREEMENTS | 137 |
| SOFTWARE | 12 |

STUDENT LOAN REPAYMENT SYSTEM

CROSS REFERENCE TO RELATED APPLICATIONS

The present application is a Continuation in Part of co-pending U.S. patent application Ser. No. 13/600,136 filed on Aug. 30, 2012, entitled "CLOUD COMPUTING SYSTEM AND METHOD FOR ACCUMULATING MONEY", which is a Continuation in Part of co-pending U.S. patent application Ser. No. 13/439,610 filed Apr. 4, 2012, entitled "COMPUTER IMPLEMENTED METHOD FOR ACCUMULATING MONEY," which claims priority to and the benefit of now expired U.S. Provisional Patent Application Ser. No. 61/471,588 filed on Apr. 4, 2011, entitled "METHOD AND SYSTEM FOR INCREMENTAL ACCUMULATION OF MONEY TO PROMOTE SELF-EMPOWERMENT AND SELF WORTH." These references are hereby incorporated in their entirety herein.

FIELD

The present embodiments generally relate to a student loan repayment system.

BACKGROUND

A need exists for a student loan repayment system that can promote self-empowerment.

A need exists for a method to encourage impulse saving as opposed to impulse spending to repay their student loans.

A need exists for a student loan repayment system that enables student loan holders with limited capital to repay their loans.

The present embodiments meet these needs.

BRIEF DESCRIPTION OF THE DRAWINGS

The detailed description will be better understood in conjunction with the accompanying drawings as follows:

FIG. 1 depicts a system usable to implement the student loan repayment method according to one or more embodiments.

FIG. 6 depicts a student loan holder interface according to one or more embodiments.

FIG. 7 depicts a cloud data storage according to one or more embodiments.

Figure 2A:
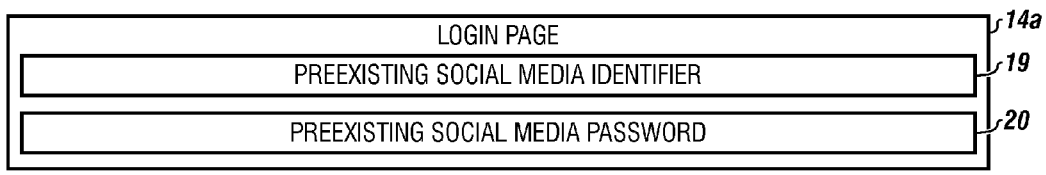
FIGS. 2A-2C depict login pages according to one or more embodiments.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a student loan repayment system for accumulating money using a downloadable software program that can be in an administrative data storage connected to an administrative processor or a cloud computing data storage connected to a cloud computing processor.

The downloadable software program can be computer radium medium, which can be referred to herein as the "MYSTASH™" application.

The student loan repayment system can encourage incremental repayment, promote self-empowerment, and increase self-worth of student loan holders with a simple and easy to use software application.

The student loan repayment system can enable student loan holders to view results of accumulations of money in real-time, such as by providing a display of progress towards a certain monetary amount to be repaid. As such, the student loan holders can celebrate success as money is accumulated for repayment of their loans.

The monetary amount can be an amount of money, such as an amount in euros, US dollars, another form of currency, or the like.

The student loan repayment system can benefit the American economy as a whole, such as by creating financially responsible citizens.

The student loan repayment system can be used to accumulate money for student loan repayment using a client device in communication with a computing cloud through a network or an administrative server with a processor and data storage on a network The administrative server or cloud based server with processor and data storage can have numerous computer instructions stored in their respective databases connected to processors. In embodiments, the software can be partially resident in the computing cloud data storage, partially resident in a non-cloud based administrative storage, and partially resident in data storage of a client device with a processor.

The computing cloud, according to an embodiment of the method can have one or more data storage units and one or more processor with data storages, and can be configured to provide at least one service and shared hardware and software resources for a plurality of client devices.

In particular embodiments, the at least one processor with data storage in the computing cloud can be configured to collect information provided by the clients to determine rates of savings in view of a goals set by the student loan holder.

In embodiments, at least one processor with data storage outside of a computing cloud can be configured to collect information provided by the clients to determine rates of savings in view of student loan repayment goals set by the student loan holder.

In other particular embodiments, the at least one data storage unit in the computing cloud can be configured to store the information associated with the student loan holder and the goals of at least one student loan holder.

The term "student loan holder" as used herein can refer to a student with student loans, a parent with student loans, a former student with student loans, or another family member or person associated with a student or former student responsible for the repayment of the student loans.

In yet other particular embodiments, the at least one processor with data storage in the computing cloud can be configured to process data associated with spending patterns captured by the client devices and saving patterns as captured by the client devices.

At least one processor with data storage can use the data associated with the saving of money to predict the accumulation of money towards a preset goal for repayment of the student loans.

In embodiments, a warning module can be configured to issue a warning prior to a predicted future failure to achieve the preset student loan repayment goals for student loan repayment.

In one or more embodiments, at least one processor with data storage can be configured to predict a timeline to achieving each of a plurality of preset student loan payback goals based upon data associated with prior student loan holder savings patterns as captured by the client devices.

The system can include computer instructions for determining a status of the savings towards the student loan repayment goal in real time.

The client devices can be a mobile phone, a smart phone, a computer, a tablet, a computer, a laptop computer, or another communication device.

The computing cloud can communicate with other computing clouds over the network, such as computing clouds with social media services, computing clouds with financial services or the like and with other networks.

In an embodiment, the system can be operated on both a computing cloud and a local network simultaneously. The local network can be used to collect the daily savings information and in embodiments, the computing cloud can be used to processes the information against preset student loan repayment goals and other timelines input to the system based on individual student loan holder preferences.

A benefit of the system is to create a money accumulation history capable of capturing, providing, and archiving money saving related data for savings toward specific student loan repayment goals.

Today, student loan holders need more sophisticated tools, such as dashboards, to monitor the status of their savings on an hour to hour basis to provide tools to control spending, by reminding student loan holders, in their pocket, about their loan repayments.

The system for student loan repayment can provide information in terms of both analyzing savings information as well as being a computing basis to perform storage and analysis of the data to provide higher-order information, such as preventive intervention needs uncovered by sophisticated algorithms hosted in one of the data storages.

The system can be used to distribute notices about failures in savings to each student loan holder at predetermined internals and uniquely schedule interventions that allow the student loan holders to get back on track for saving toward their goals.

The system can allow information from the student loan holders to be analyzed virtually instantaneously. This provides for faster resolution of problems.

The system can connect to social media services, such as FACEBOOK®, micro-blogging websites, such as TWITTER®, or the like to create the student loan holder profile automatically.

Computer instructions in the software which can be partially resident in the computing cloud data storage, partially resident in an administrative data storage and partially resident on a client device can enable the student loan holder to import a student profile from the preexisting social media service or third party service; thereby forming a student profile quickly and efficiently.

The system can use a network that can be a satellite network, a cellular network, the internet, a wireless network, a wired network, a phone line, any communications network, or combinations thereof. The network can connect the client devices to the cloud computing processor and data storage and the administrative processor and data storage.

In embodiments, the student loan holder can create a unique login with a student identifier and new password for use with the software.

Turning now to the Figures, FIG. 1 depicts components of the student loan repayment system according to one or more embodiments.

The student loan repayment system 8 can connect to a client device 82 and an administrative server 83 in communication with a network 16.

The network 16 can communicate with a computing cloud 18 with cloud data storage 26.

The cloud data storage can contain computer instructions to process information on one or more accounts for accumulating money 71.

The client device 82 can have a processor and data storage for displaying data 109 relative to the accounts for accumulating money. The data can be presented on a display 111.

The system can include one or more student loans, such as accounts 59a and 59b, each having an amount of money to be repaid, depicted as account money 60a and 60b. The accounts 59a and 59b can be linked to the accounts for accumulating money 71, the client device 82, the administrative server 83, or combinations thereof through the network 16.

In operation, the accounts 59a and 59b can be configured to receive deposits 68a and 68b from the accounts for accumulating money 71

The accounts for accumulating money can be accounts at a financial institution, savings accounts, checking accounts, debit accounts, credit card accounts, direct deposit accounts, other financial accounts eligible for transferring the deposits, bank accounts, credit union accounts.

A social media service 25 can be in communication with the network 16 and linked to the accounts 59a and 59b, the accounts for accumulating money 71, the client device 82, the administrative server 83, the computing cloud 18, or combinations thereof for communication with the software program product which social media service can have its own identifier that can be used by the account for accumulating money.

An application store 11, such as ITUNES®, can be in communication with the network 16 for providing the computer program product MyStash that creates the tracking for the accounts for accumulating money 71 to one or more client devices 82.

The client device has a processor and data storage and is adapted for storing the computer program product MyStash and allowing a student loan holder 22 to download the client device portion of the computer program product 29 to the client device 82.

A friend 303 can be in communication with the network 16 and linked to the accounts 59a and 59b, the accounts for accumulating money 71, the client device 82 and the computer program product in the administrative server or the cloud data storage can allow the friend 303 to transmit a deposit 68c to the accounts for accumulating money 71, such as or directly to the student loan account 59a and 59b. The friend 303 can communicate through the network 16 via a computer, mobile phone, or the like.

A business 302, such as a retailer, can be in communication with the network 16 and linked to the accounts 59a and 59b, the accounts for accumulating money 71, the client device 82, the administrative server 83, the computing cloud 18, or combinations thereof for providing rebates or incentives to the student loan accounts 59a and 59b as deposits 68d. The deposits 68d can be transmitted to the accounts for accumulating money 71, after a student loan holder 22 purchases a product or service from the business 302.

In operation, the business 302 can operate an account linked to the accounts for accumulating money 71 for providing the deposits 68d. For example, the business 302 can be a grocery store that can offer the deposits 68d in order to attract business, such as a deposit of 5 percent of a customer's bill into the accounts for accumulating money 71.

One or more gift card accounts 300 can be in communication with the network 16 and linked to the accounts 59a and 59b, the accounts for accumulating money 71, the client device 82, the administrative server 83, the computing cloud 18, or combinations thereof, and can be used to make a deposit 68e into the accounts for accumulating money 71 or to the accounts 59a, 59b.

A third party 301 can be in communication with the network 16 and linked to the accounts 59a and 59b, the accounts for accumulating money 71, the client device 82, the administrative server 83, the computing cloud 18, or combinations thereof for providing deposits 68f of funds into the accounts for accumulating money 71 or the student loan accounts 59a and 59b. The third party 301 can be a government agency or bureau, such as the Social Security Administration, a health organization, or another third party.

In an embodiment, the third party 301 can provide the student loan holder 22 with offers. The offers can be discounts, benefits, or combinations thereof.

In one or more embodiments, the third party 301 can be an employer of one or more of the student loan holder 22, and can transfer direct deposits into the accounts for accumulating money 71 or student loan accounts using a direct deposit service. The employer can provide additional deposits of preset amounts of money each time the employer issues the student loan holder 22 a payroll compensation.

For example, if the student loan holder 22 has met certain goals during a pay period, when the employer issues a payroll compensation for the student loan holders 22 the employer can also issue a direct deposit into the accounts for accumulating money 71 or the student loan account while the money is tracked by the MyStash computer program product.

The amount that the employer deposits into the accounts for accumulating money 71 can be determined by the employer, such as a matching contribution, a percentage of payroll compensation, a percentage of the student loan holder's 22 contributions to the accounts for accumulating money 71, or a predetermined amount of money.

The computing cloud 18 or the administrative server 83 can transmit prompts 100a, 100b to the client device 82 for presentation to the student loan holder 22 in a student loan holder interface 111 on the client device 82.

In one or more embodiments, the prompts 100a and 100b can include a prompt to not buy a product or service to accumulate an amount of money, and if the student loan holder 22 does not buy the product or service, computer instructions in the computing cloud 18 or the administrative server 83 can enable the student loan holder 22 to initiate a transfer of the amount of money into the accounts for accumulating money 71.

For example, the prompts 100a and 100b can cause the client device application 29 presented in the student loan holder interface 111 to prompt the student loan holder 22 to buy a lower priced product or service 24 as a substitute for a higher priced product or service for accumulating an amount of money.

The prompts 100a and 100b can include a pre-lunchtime prompt, a pre-dinner prompt, a coffee break prompt, or the like, which can suggest to the student loan holder 22 to buy lower priced lunch, dinner, or coffee break products or services and accumulate an amount of money.

In operation, if the student loan holder 22 purchases the lower priced lunch, dinner, or coffee break products or services, computer instructions in the computing cloud 18 or administrative server 83 can enable the student loan holder 22 to initiate a transfer of the money saved into the accounts for accumulating money 71.

The prompts 100a and 100b can include a supermarket prompt to buy lower priced supermarket products or services and accumulate an amount of money. The same prompt can be a prompt to buy a similar product or service with a rebate to be deposited into the account for accumulating money. In operation, if the student loan holder 22 purchases the lower priced supermarket products or services, computer instructions in the computing cloud 18 or administrative server 83 can enable the student loan holder 22 to initiate a transfer of the amount of money not spent into the accounts for accumulating money 71.

For example, computer instructions in the computing cloud data storage or administrative processor can suggest purchasing beans or another high protein, low fat, and low priced product instead of a higher priced item, such as sushi or steaks, and can compute the money repaid and encourage the student loan holder 22 to deposit the money not spent into the accounts for accumulating money 71 to pay off the student loan.

The prompts 100a and 100b can suggest to the student loan holder 22 to discontinue purchasing gym memberships not being used, movie channels services or other television related services not being used, or insurance premiums that are no longer needed.

Computer instructions in the computing cloud 18 or the administrative server 83 can present the student loan holder interface 111 to the student loan holder 22, such as on a display associated with the client device 82. The student loan holder interface 111 can present data 109 from the cloud data storage 26, accounts for accumulating money 71, accounts 59a and 59b, administrative server 83, or combinations thereof for the student loan holder 22 to view.

The data 109 can include results, reports of progress towards the monetary amount to be accumulated, a notice to verify initiation of each deposit, all deposits for a single day, a total amount accumulated to date, a record of each deposit made, a time and date for each deposit made, an alarm, an award, a comparison of the student loan holder's progress towards the monetary amount to be accumulated with other student loan holders' progress towards similar monetary amounts to be accumulated, tips, cost effective celebration suggestions, celebration indicators, social media, a vector based score, goal information, progress information, deposit information, a rate of progress towards goals, information associated with purchases of products or services, a purchasing pattern, the student profile, and any other data repaid within the cloud data storage 26, the client device data storage, the administrative data storage in the administrative server 83, or combinations thereof.

In operation, the student loan holder 22 can use the input devices 150 of the client device 82 to operate the client device application 29 for communication with the computing cloud 18, the administrative server 83, and combinations thereof to store information on the accounts for accumulating money 71, and accounts 59a and 59b.

Figure 2B:
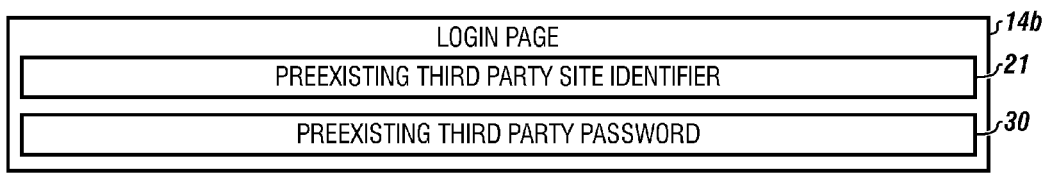
Figure 2C:
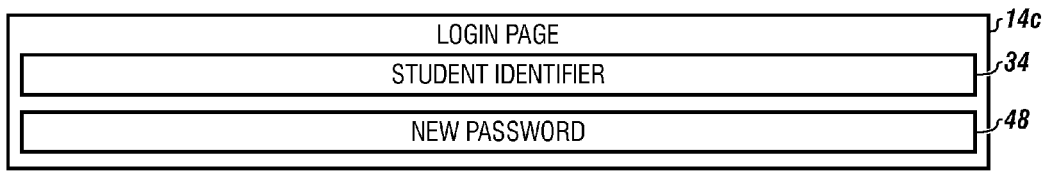

FIGS. 2A, 2B, and 2C depict embodiments of a login page of the software which is partially resident in the computing cloud data storage, partially resident in the administrative server, and partially resident on a client device for allowing student loan holders to login to the software using client devices.

The login page 14a can allow the student loan holders to login to the client device downloaded software and connect to the network using a preexisting social media identifier 19 and a preexisting social media password 20.

The login page 14b can allow the student loan holders to login to the client device downloaded software and connect to the network using a preexisting third party site identifier 21 and a preexisting third party password 30.

The login page 14c can allow the student loan holder to login to the client device downloaded software and connect to the network using a client device while using a student identifier 34 and a new password 48.

Figure 3:
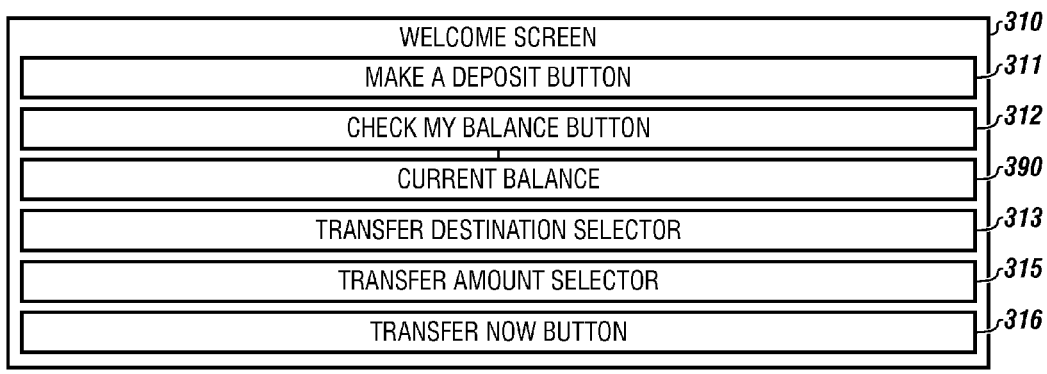
FIG. 3 depicts a welcome screen according to one or more embodiments.

FIG. 3 depicts a welcome screen that can be presented to student loan holders that have logged in to the software.

The welcome screen 310 can include a make a deposit button 311, allowing the student loan holder to make deposits into the accounts for accumulating money.

The welcome screen 310 can include check my balance button 312, allowing student loan holder to view a current balance 390 on the client devices.

The welcome screen 310 can include a transfer destination selector 313, allowing student loan holder to select an account to which funds are to be sent from the accounts for accumulating money.

The welcome screen 310 can include a transfer amount selector 315, allowing student loan holders to select an amount of funds from the accounts for accumulating money to be transferred to the account.

The welcome screen 310 can include a transfer now button 316, allowing student loan holders to initiate transfer of funds from the accounts for accumulating money 71 to the account.

The buttons and selectors in the welcome screen 310 can enable the student loan holders to transmit information and commands to actuate the computer instructions therein. As such, in operation, when the student loan holders use the buttons or selectors in the welcome screen 310, the client device can activate computer instructions in the computing cloud data storage or the administrative data storage to perform associated actions, such as initiation of a transfer of funds.

The buttons and selectors can be touch screen buttons presented by the student loan holder interface or other buttons on the client device.

Figure 4:
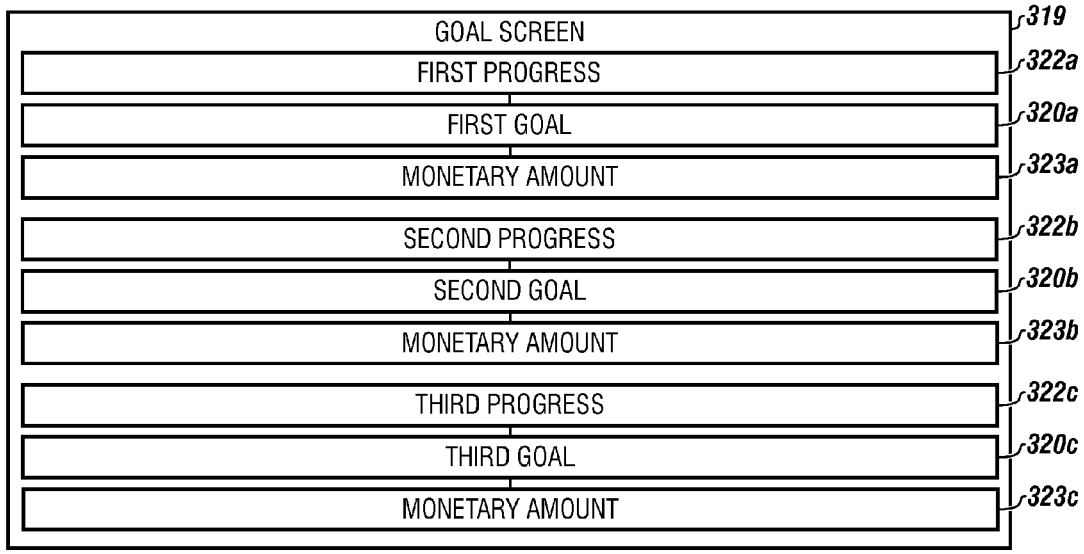
FIG. 4 depicts a goals screen according to one or more embodiments.

FIG. 4 depicts a goal screen that can be presented to student loan holders that have logged in to the software.

The goal screen 319 can be presented in the student loan holder interface on the client devices.

The goal screen 319 can customizable, allowing the student loan holders to input custom goals and track progress towards the goals.

For example, the goal screen 319 can present a first goal 320a to pay back a monetary amount 323a, such as pay back $1000 within 1 year.

The goal screen 319 can also present a first progress 322a towards the first goal 320a. For example, the first progress 322a can indicate that the associated student loan holder has paid back $200 and achieved 20 percent of the first goal 320a.

The goal screen 319 can present a second goal 320b to pay back a monetary amount 323b, such as a pay off my sister's student loan of $1000. The goal screen 319 can also present a second progress 322b towards the second goal 320b. For example, the second progress 322b can indicate that the associated student loan holder has paid $750 and has achieved 75 percent of the second goal 320b.

The goal screen 319 can present a third goal 320c to pay back a monetary amount 323c, such as a monetary goal to pay $2000 within 24 months. The goal screen 319 can also present a third progress 322c towards the third goal 320c.

In one or more embodiments, the progress 322a-322c can be presented as digital graphical displays, pie charts, bar graphs, charts, tables, graphs, visual displays of non-monetary goal indicators, or combinations thereof.

Figure 5:
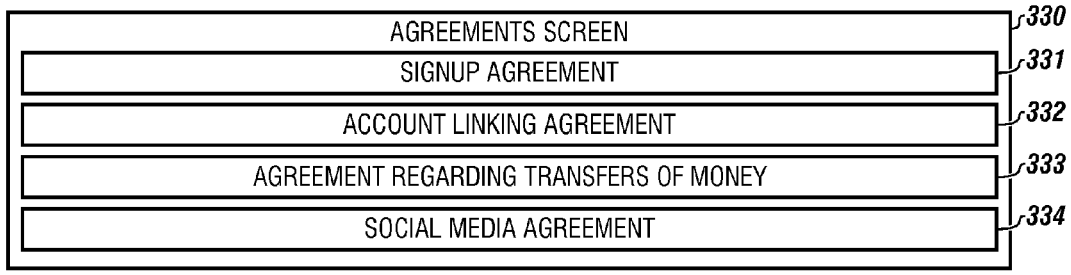
FIG. 5 depicts an agreements screen according to one or more embodiments.
Figure 8A:
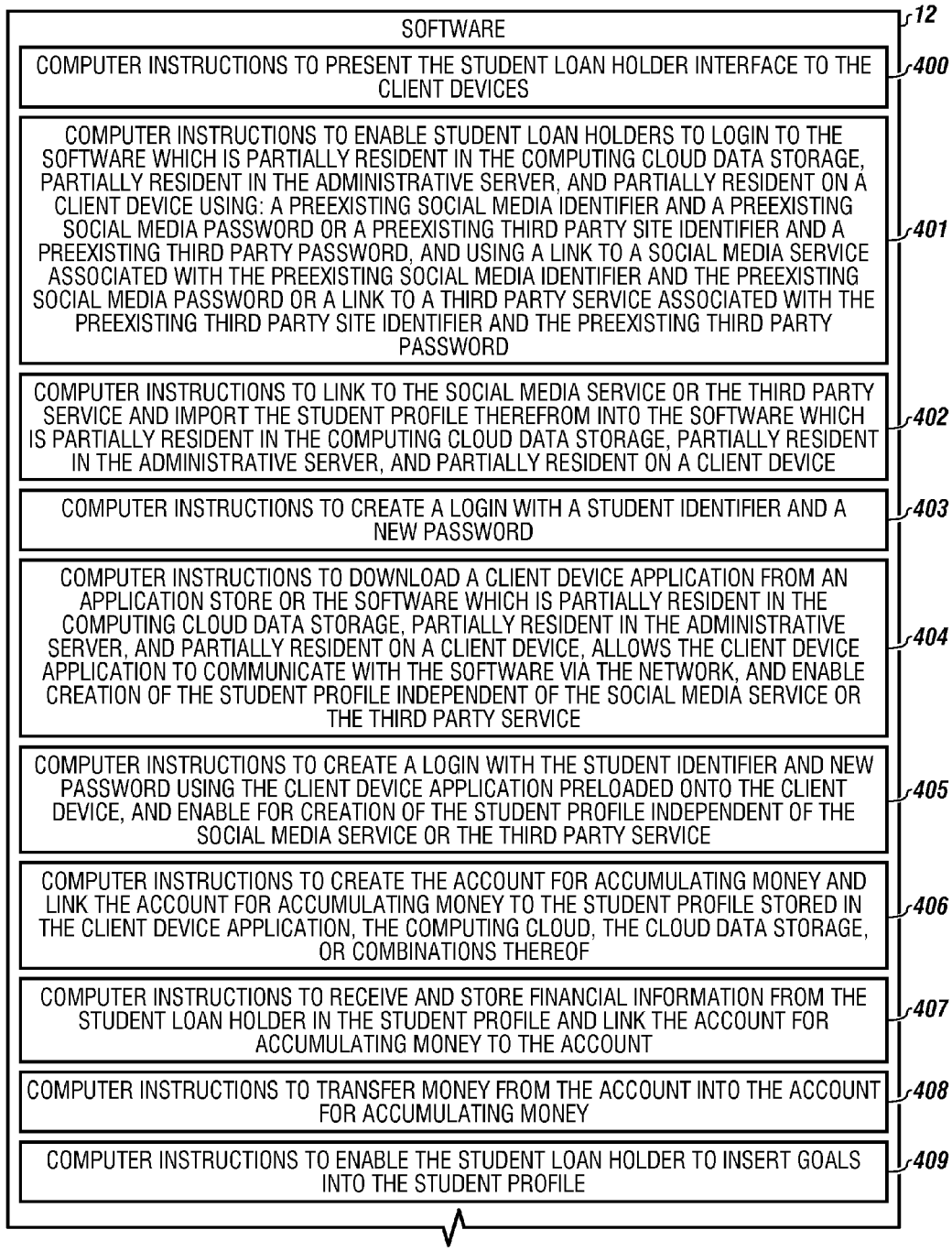
FIGS. 8A-8D depict computer instructions of a downloadable software which is partially resident in the computing cloud data storage, partially resident in the administrative server, and partially resident on a client device from a computing cloud according to one or more embodiments.
Figure 8B:
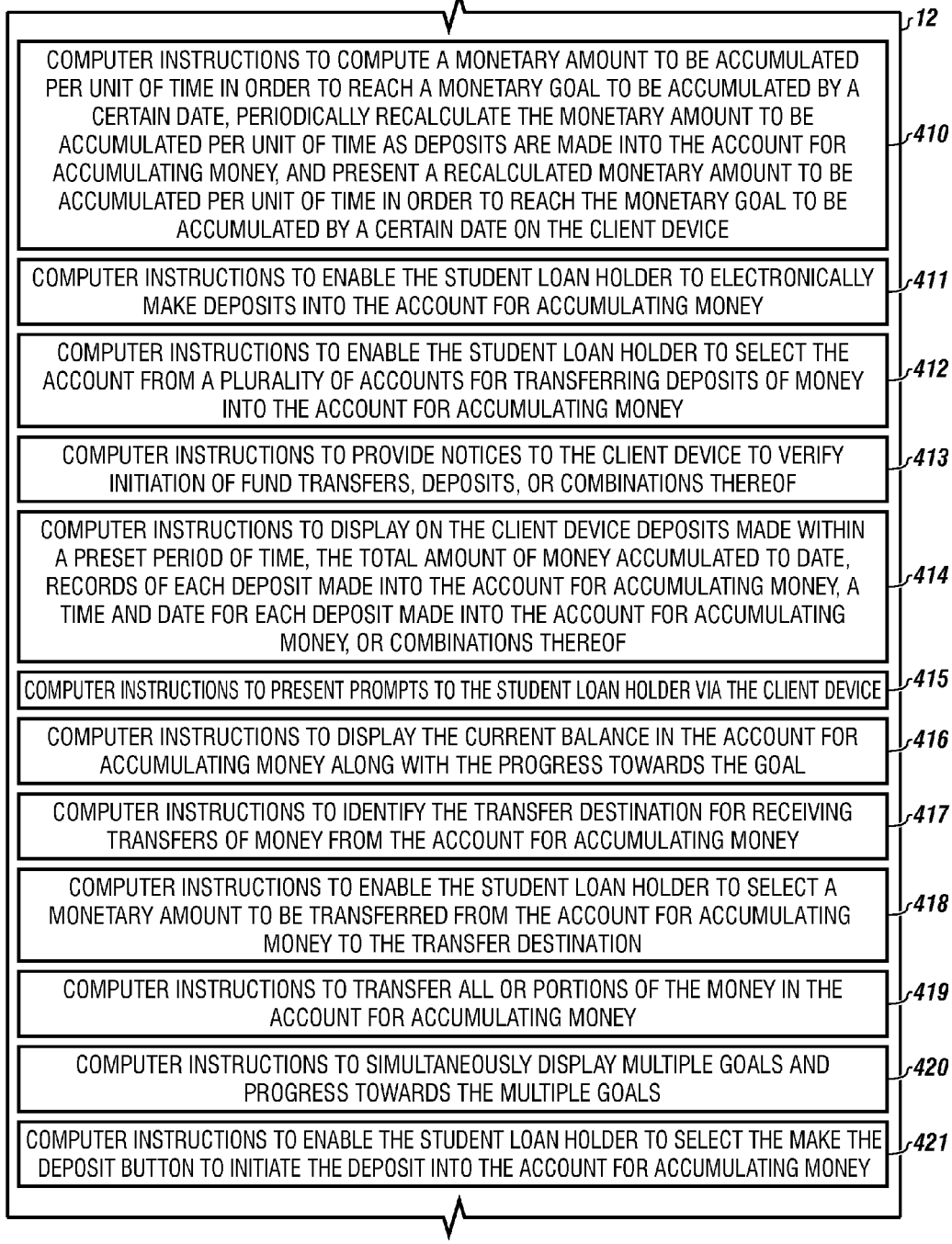
Figure 8C:
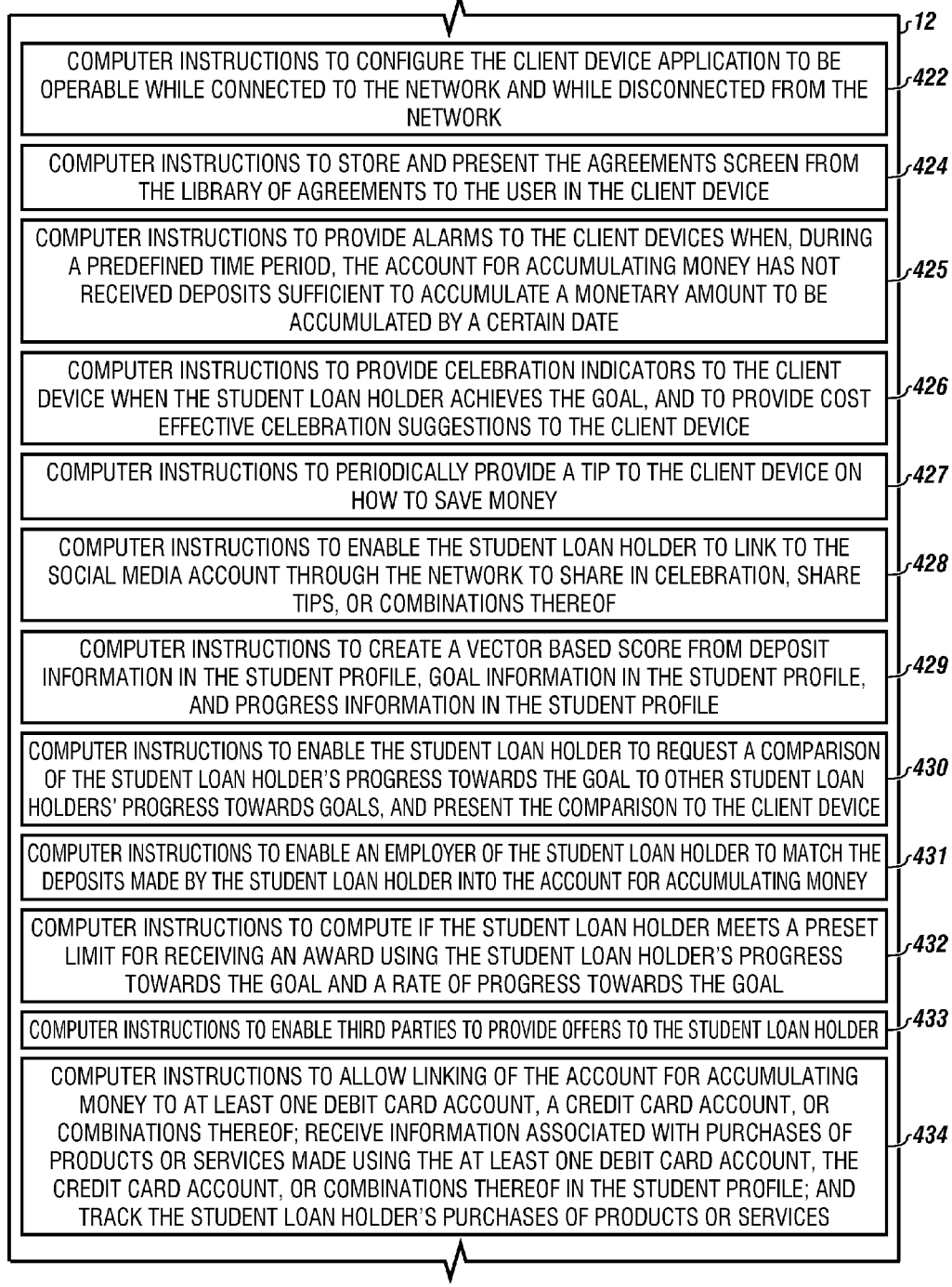
Figure 8D:
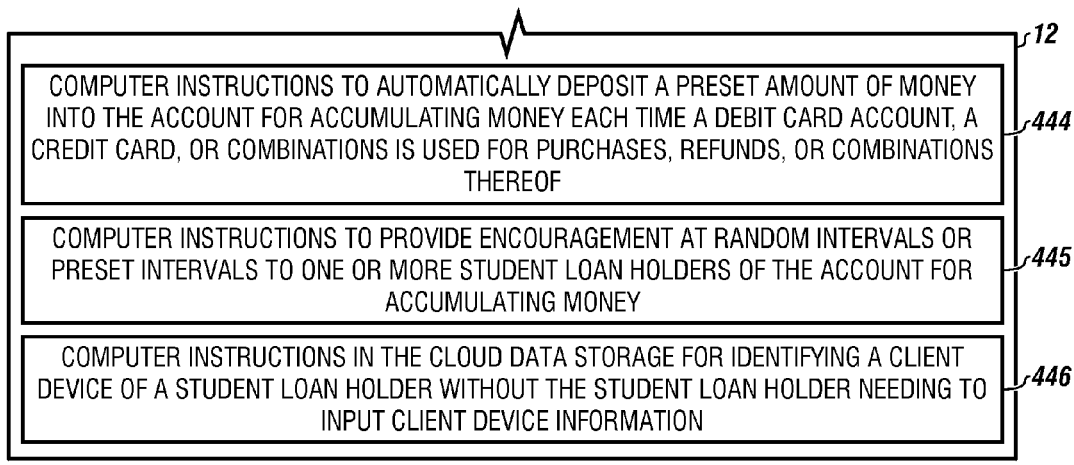

FIG. 5 depicts an agreements screen that can be presented to student loan holders that have logged in to the software which is partially resident in the computing cloud data storage, partially resident in the administrative server, and partially resident on a client device.

The agreements screen 330 can be presented in the student loan holder interface on the client devices.

The agreements screen 330 can present various agreements from a library of agreements in one of the data storages.

The agreements screen 330 can present a signup agreement 331, allowing the student loan holder to obtain a license to use the software.

The agreements screen 330 can present an account linking agreement 332 that links a financial institution, a third party, or combinations thereof to the account for accumulating money to enable the software to operate.

The agreements screen 330 can present an agreement regarding transfers of money 333, allowing for transfers of money into and out of the account for accumulating money. In one or more embodiments, the agreement regarding transfers of money 333 can be an employer-employee agreement that enables a direct deposit service to deposit money into the account for accumulating money.

The agreements screen 330 can present a social media agreement 334 that links the social media service to the MyStash computer program product.

In operation, the student loan holders, financial institutions, third parties, social media services, employers, the like, or combinations thereof can sign one or more of the agreements from the library of agreements for use of the software which can be partially resident in the computing cloud data storage, partially resident in the administrative server, and partially resident on a client device.

FIG. 6 depicts the student loan holder interface presented in the client device according to one or more embodiments.

The student loan holder interface 111 can be presented in the client device for presentation of various portions of information to the student loan holders, allowing the student loan holders to interact with the software for accumulation of money.

The student loan holder interface 111 can present a notice 31 to verify initiation of fund transfers, deposits, or both.

The student loan holder interface 111 can present a total amount of money accumulated to date 69 for the associated student loan holder, a record 70 of each deposit made into the account for accumulating money, a time and date 73 for each deposit made into the account for accumulating money, a comparison 105 of the student loan holder's progress towards the goal to other student loan holder's progress towards the goal, a vector based score 104 that ranks the student loan holder relative to other student loan holders, a rate of progress 108, and offers 110 from third parties.

The student loan holder interface 111 can also present an alarm 101, such as when, during a predefined time period, the account for accumulating money has not received deposits sufficient to accumulate a monetary amount to be accumulated by a certain date. For example, if the student loan holder is not making deposits at a computed amount that needs to be repaid per day, computer instructions in cloud data storage can send an audio alarm, visual alarm, or both to the client device in the student loan holder interface 111.

The student loan holder interface 111 can also present a celebration indicator 102 and celebration suggestions 103 when the student loan holder achieves a goal or makes progress towards achieving a goal. For example, if the student loan holder reaches the halfway point of accumulating the monetary amount to be repaid, computer instructions in the cloud data storage of the computing cloud can transmit the celebration indicator 102 to the client device in the student loan holder interface 111 to congratulate and encourage the student loan holder.

The celebration indicator 102 can be animated graphical display, words of praise, words of support, an audio indicator, a visual indicator, a textual indicator, or combinations thereof.

The celebration suggestions 103, which can be cost effective celebration suggestions, can be coupons for products or services, instructions on how to receive promotional items, or combinations thereof.

The student loan holder interface 111 can also present awards 107, such as electronic gold stars, electronic badges, or student loan holder scores. In operation, if the student loan holder is accumulating money in the account for accumulating money, computer instructions in the computing cloud can provide the client device with a verbal award, a coupon, a promotional item, or the like. Third parties can use the awards 107 to encourage the student loan holder to spend the student loan holder's money within the account for accumulating money with the third party.

FIG. 7 depicts the cloud data storage according to one or more embodiments.

The cloud data storage 26 can have various portions of information and other data stored therein. For example, the cloud data storage 26 can include a student profile 28 stored therein.

The student profile 28 can include financial information 54, a purchasing pattern 79, preset limits 106 for triggering alarms, information associated with purchases of products or services 112, a name 114 of the student loan holder, an education institution identification number 81, a social security number 115 for the student loan holder, a tax identification number 116 for the student loan holder, an address 117 for the student loan holder, a phone number 118 for the student loan holder, an email address 119 for the student loan holder, and a security question 120 associated with the student loan holder. The security question 120 can have a security question answer 121 linked thereto.

In one or more embodiments, the student profile can have the student's educational institution identification number.

The cloud data storage 26 can also include the library of agreements 137 and the software 12 which can be partially resident in the computing cloud data storage, partially resident in the administrative server, and partially resident on the client device and stored therein.

FIGS. 8A-8D depict the software which is partially resident in the computing cloud data storage, partially resident in the administrative server, and partially resident on a client device according to one or more embodiments.

The software 12 which can be partially resident in the computing cloud data storage, partially resident in the administrative server, and partially resident on a client device can include a plurality of computer instructions. The plurality of computer instructions of the software 12 can also form a client device application when stored in the client device.

The software 12 can include computer instructions to present the student loan holder interface to the client devices 400.

The software 12 can include computer instructions to enable student loan holders to login to the software which is partially resident in the computing cloud data storage, partially resident in the administrative server, and partially resident on a client device using: a preexisting social media identifier and a preexisting social media password or a preexisting third party site identifier and a preexisting third party password, and using a link to a social media service associated with the preexisting social media identifier and the preexisting social media password or a link to a third party service associated with the preexisting third party site identifier and the preexisting third party password 401.

The software 12 can include computer instructions to link to the social media service or the third party service and import the student profile therefrom into the software which is partially resident in the computing cloud data storage, partially resident in the administrative server, and partially resident on a client device 402.

The software 12 can include computer instructions to create a login with a student identifier and a new password 403.

The software 12 can include computer instructions to download a client device application from an application store or the software which is partially resident in the computing cloud data storage, partially resident in the administrative server, and partially resident on a client device, allows the client device application to communicate with the software via the network, and enable creation of the student profile independent of the social media service or the third party service 404.

The software 12 can include computer instructions to create a login with the student identifier and new password using the client device application preloaded onto the client device, and enable for creation of the student profile independent of the social media service or the third party service 405.

The software 12 can include computer instructions to create the account for accumulating money and link the account for accumulating money to the student profile stored in the client device application, the computing cloud, the cloud data storage, or combinations thereof 406.

The software 12 can include computer instructions to receive and store financial information from the student loan holder in the student profile and link the account for accumulating money to the account 407.

For example, the financial information can include a name of a financial intuition operating the account, such as a name of a bank operating a debit account of the student loan holder's; an account number associated with the account, such as a bank account number; and other information related to the account; thereby allowing the software 12 which can be partially resident in the computing cloud data storage, partially resident in the administrative server, and can be partially resident on at least one client device to access the student loan holders account for linking to the account for accumulating money.

The software 12 can include computer instructions to transfer money from the account into the account for accumulating money 408.

The software 12 can include computer instructions to enable the student loan holder to insert goals into the student profile 409.

For example, the software 12 which is partially resident in the computing cloud data storage, partially resident in the administrative server, and partially resident on at least one client device can provide input fields in the student loan holder interface, allowing the student loan holder to operate the client device to insert the goals for storage in the student profile. The goals can be monetary goals to be accumulated by a certain date into the account for accumulating money, non-monetary goals to be completed by a certain date, or combinations thereof. In operation, upon completion of a non-monetary goal, the student loan holder can be allowed to deposit a monetary amount into the account for accumulating money, a third party can be allowed to deposit a monetary amount into the account for accumulating money on behalf of the student loan holder, or combinations thereof.

The software 12 can include computer instructions to compute a monetary amount to be accumulated per unit of time in order to reach a monetary goal to be accumulated by a certain date, periodically recalculate the monetary amount to be accumulated per unit of time as deposits are made into the account for accumulating money, and present a recalculated monetary amount to be accumulated per unit of time in order to reach the monetary goal to be accumulated by a certain date on the client device 410.

The software 12 can include computer instructions to enable the student loan holder to electronically make deposits into the account for accumulating money 411.

The deposits can be money from a gift card; from third parties for achieving goals; from third parties as an incentive or a rebate upon purchasing of an item, service, or combinations thereof; from a friend, from a family member, from another party related to the student loan holder; or combinations thereof.

The software 12 can include computer instructions to enable the student loan holder to select the account from a plurality of accounts for transferring deposits of money into the account for accumulating money 412.

The software 12 can include computer instructions to provide notices to the client device to verify initiation of fund transfers, deposits, or combinations thereof 413.

The software 12 can include computer instructions to display on the client device deposits made within a preset period of time, the total amount of money accumulated to date, records of each deposit made into the account for accumulating money, a time and date for each deposit made into the account for accumulating money, or combinations thereof 414.

The software 12 can include computer instructions to present prompts to the student loan holder via the client device 415.

The software 12 can include computer instructions to display the current balance in the account for accumulating money along with the progress towards the goal 416.

The software 12 can include computer instructions to identify the transfer destination for receiving transfers of money from the account for accumulating money 417.

The software 12 can include computer instructions to enable the student loan holder to select a monetary amount to be transferred from the account for accumulating money to the transfer destination 418.

The software 12 can include computer instructions to transfer all or portions of the money in the account for accumulating money 419.

The software 12 can include computer instructions to simultaneously display multiple goals and progress towards the multiple goals 420. The multiple goals and progress can be displayed or pushed to the client device at preset intervals, such as an anniversary date or a predetermined dates, the first of each month, or at random intervals or in combinations thereof.

The software 12 can include computer instructions to enable the student loan holder to select the make the deposit button to initiate the deposit into the account for accumulating money 421.

The software 12 can include computer instructions to configure the client device application to be operable while connected to the network and while disconnected from the network 422.

The software 12 can include computer instructions to store and present the agreements screen from the library of agreements to the student loan holder in the client device 424.

The software 12 can include computer instructions to provide alarms to the client devices when, during a predefined time period, the account for accumulating money has not received deposits sufficient to accumulate any monetary amount to be accumulated by a certain date 425.

The software 12 can include computer instructions to provide celebration indicators to the client device when the student loan holder achieves the goal, and to provide cost effective celebration suggestions to the client device 426.

The software 12 can include computer instructions to periodically provide a tip to the client device on how to save money 427, which can also include random tips to a client device on healthful living.

The software 12 can include computer instructions to enable the student loan holder to link to the social media account through the network to share in celebration, share tips, or combinations thereof 428.

The software 12 can include computer instructions to create a vector based score from deposit information in the student profile, goal information in the student profile, and progress information in the student profile 429.

For example, the vector based score can be created using singular value decomposition or a similar method for vectorizing the deposit information, goal information, and progress information in the student profile; and for analyzing and comparing the vectorized information from the student profile for similarities. The vector based scores can be provided to the student loan holders associated with the student profiles.

The deposit information can include information about deposits made by the student loan holder, including but not limited to a frequency of deposits, a size of deposits, and the like.

The goal information can include information about goals set by the student loan holder, including but not limited to types of goals, monetary amount of goals, monetary amounts associated with the goals, frequency of achievement of goals, time frames set for goals, number of goals, size of goals, and the like.

The progress information can include information about progress towards the goals, including but not limited to the rate of progress, measurements of progress, and the like.

The software 12 can include computer instructions to enable the student loan holder to request a comparison of the student loan holder's progress towards the goal to other student loan holders' progress towards goals, and present the comparison to the client device 430.

For example, the software 12 which can be partially resident in the computing cloud data storage, partially resident in the administrative server, and partially resident on a client device can receive a request through the student loan holder interface from the student loan holder to perform a comparison. The software can compare the student loan holder's rate of accumulating money in the account for accumulating money to another student loan holder's rate of accumulating money in the other student loan holder's account for accumulating money, such as by determining a numerical difference between the rates. The software can present the comparison to the client device.

The software 12 can include computer instructions to enable an employer of the student loan holder to match the deposits made by the student loan holder into the account for accumulating money 431.

The software 12 can include computer instructions to compute if the student loan holder meets a preset limit for receiving an award using the student loan holder's progress towards the goal and a rate of progress towards the goal 432.

For example, if the student loan holder's progress towards the goal is at a rate that is higher than necessary to reach the goal, the award can be provided.

The software 12 can include computer instructions to enable third parties to provide offers to the student loan holder 433.

For example, third parties can present discounts, benefits, or combinations thereof for spending monetary amounts to be accumulated in the student loan holder interface.

The software 12 can include computer instructions to allow linking of the account for accumulating money to at least one debit card account, a credit card account, or combinations thereof; receive information associated with purchases of products or services made using the at least one debit card account, the credit card account, or combinations thereof in the student profile; and track the student loan holder's purchases of products or services 434.

The software 12 can include computer instructions to automatically deposit a preset amount of money into the account for accumulating money each time a debit card account, a credit card, or combinations is used for purchases, refunds, or combinations thereof 444.

The software 12 can include computer instructions to provide encouragement at random intervals or preset intervals to one or more student loan holders of the account for accumulating money 445.

The software can include computer instructions in the cloud data storage for identifying a client device of a student loan holder without the student loan holder needing to input client device information 446.

The embodiments relate to a student loan repayment method for accumulating money using a software program product which is partially resident in a student loan administrative server and partially resident on a client device of a student with student loans accessible through a network.

The student loan repayment method can include using the client device to log into a student loan administrative server.

The student loan administrative server can include computer instructions for allowing the student to login to the software program product which is partially resident in a computing cloud, or in a student loan administrative server not in a computing cloud, or combinations thereof; and partially resident on the client device using: a preexisting social media identifier and a preexisting social media password or a preexisting third party site identifier and a preexisting third party password.

The student loan administrative server can include computer instructions allowing the student to use a link to a social media service associated with the preexisting social media identifier and the preexisting social media password or allowing the student to use a link to a third party service associated with the preexisting third party site identifier and the preexisting third party password.

The student loan administrative server can include computer instructions to either link to the social media service or the third party service and import a student profile therefrom into the software program product or allow a student to create a student profile in the client device for transmission to the student loan administrative server.

The student loan administrative server can include computer instructions to create a login with a student identifier and a new password.

The student loan administrative server can also include computer instructions create an account for accumulating money and link the account for accumulating money to the student loan holder profile, wherein the student loan holder profile is stored in the client device application, the cloud data storage, or combinations thereof.

The student loan repayment method can include receiving financial information from the student loan holder in the student loan holder profile for linking the account for accumulating money to an account.

The student loan repayment method can include transferring money from the account into the account for accumulating money.

The student loan repayment method can include inserting at least one monetary goal into the student loan holder profile for funds to be accumulated by a certain date into the account for accumulating money.

The student loan repayment method can include using computer instructions to compute a monetary amount to be accumulated per unit of time in order to reach the goal, periodically recalculate the monetary amount to be accumulated per unit of time, and present a recalculated monetary amount to be accumulated per unit of time in order to reach the goal on the client device.

The student loan repayment method can include electronically making or receiving deposits into the account for accumulating money. The deposits can include money from a gift card; money from the third party or another third party for achieving the goal wherein the third party can be an employer of the student loan holder; money from the third party or another third party as an incentive or a rebate to the student loan holder upon purchasing of an item, service, or combinations thereof; money from a friend, a family member, another party related to the student loan holder; or combinations thereof.

In an embodiment, the student loan repayment method can include connecting with the cloud data storage or administrative data storage to use computer instructions to select the account from a plurality of accounts for transferring deposits of money into the account for accumulating money; provide a notice to the client device to verify initiation of fund transfers, deposits, or combinations thereof; and display on the client device of at least one of: deposits made within a preset period of time; a total amount of money accumulated to date; a record each deposit made into the account for accumulating money; and a time and date for each deposit made into the account for accumulating money.

In an embodiment, the student loan repayment method can include using computer instructions in the cloud data storage or administrative data storage to present prompts to the student loan holder via the client device. The prompts can include: a prompt to not buy a product or service, and to save an amount of money equivalent to the product or service not purchased into the account for accumulating money; a prompt to buy a lower priced product or service as a substitute for a higher priced product or service, and to save an amount of money equivalent to the difference between the higher price and the lower price into the account for accumulating money; a prompt to buy a similar product or service with a rebate to be repaid into the account for accumulating money; a bill paying prompt; or combinations thereof.

The bill paying prompt can be a prompt to: save an amount of money while paying a bill or save on fees associated with the bill; pay a bill early and initiate a transfer of an amount of money equivalent to a late fee or a finance charge into the account for accumulating money, wherein the late fee or finance charge is associated with paying the bill late; pay a bill early to raise the student loan holder's credit score; cease purchasing products or services not being fully utilized; consider a lower priced alternative associated with a bill; or combinations thereof.

In an embodiment, the student loan repayment method can include using computer instructions in the cloud data storage or the administrative data storage to present to a client device: a welcome screen; a make a deposit button for actuating computer instructions to enable the student loan holder to select a the make a deposit button to initiate deposits into the account for accumulating money; a check my balance button for actuating computer instructions to display a current balance in the account for accumulating money along with a progress towards the goal; a transfer destination selector for actuating computer instructions to identify a transfer destination for receiving transfers of money from the account for accumulating money; a transfer amount selector for actuating computer instructions to enable the student loan holder to select a monetary amount to be transferred from the account for accumulating money to the transfer destination; a transfer now button for actuating computer instructions to transfer all or portions of the money in the account for accumulating money; or combinations thereof.

The transfer destination can be an account with a financial service company, a bank account, a brokerage firm account, a mutual fund, a checking account, a savings account, or combinations thereof.

In an embodiment of the student loan repayment method, the progress can be presented as a digital graphical display, a pie chart, a bar graph, a chart, a table, a graph, a visual display of a non-monetary goal indicator, or combinations thereof.

In an embodiment, the student loan repayment method can include using computer instructions in the cloud data storage or administrative data storage to store and present an agreements screen from a library of agreements to the student loan holder in the client device.

The agreement screen can include: a signup agreement for the student loan holder to obtain a license to use the software program product which is partially resident in the computing cloud, or partially resident in the administrative server, and partially resident on a client device for the account for accumulating money; an account linking agreement that links a financial institution, a third party, or combinations thereof to the account for accumulating money; an agreement regarding transfers of money that is an employer-employee agreement and enables a direct deposit service to deposit money into the account for accumulating money; a social media agreement that links the social media service to the software program product and the account for accumulating money; and combinations thereof.

In an embodiment, the student loan repayment method can include using computer instructions in the data storage to provide a notification to the client device when, during a predefined time period, the account for accumulating money has not received deposits sufficient to accumulate the monetary amount to be accumulated by a certain date.

In an embodiment, the student loan repayment method can include using computer instructions in the data storage to provide celebration indicators to the client device when the student loan holder achieves at least one goal. The celebration indicators can include: an animated graphical display, words of praise, words of support, an audio indicator, a visual indicator, a textual indicator, or combinations thereof.

In an embodiment, the student loan repayment method can include using computer instructions in the data storage to periodically provide a tip to the client device for viewing by the student loan holder on how to save money.

In an embodiment, the student loan repayment method can include using computer instructions in the data storage to enable the student loan holder to link to the social media account through the network to share information.

In an embodiment, the student loan repayment method can include using computer instructions in the data storage to create a vector based score from deposit information in the student loan holder profile, goal information in the student loan holder profile, and progress information in the student loan holder profile, wherein the vector based score ranks the student loan holder relative to other student loan holders.

In an embodiment, the student loan repayment method can include using computer instructions in the data storage to enable the student loan holder to request a comparison of the student loan holder's progress towards at least one goal to other student loan holders' progress towards their goal or a plurality of goals, and present the comparison to the client device.

In an embodiment, the student loan repayment method can include using computer instructions in the data storage to provide encouragement at random intervals or preset intervals to one or more student loan holders of the account for accumulating money.

In an embodiment, the student loan repayment method can include using computer instructions in the data storage to enable third parties to provide offers to the student loan holder comprising a member of the group: rebates, starting bonuses, incentives that are deposited into the account for accumulating money, wherein the offers are affiliated with a good or service desired by the student loan holder.

In an embodiment, the student loan repayment method can include using computer instructions in the data storage to allow linking of the account for accumulating money to a debit card account, a credit card account, or combinations thereof. The information associated with purchases of products or services made using the debit card account, the credit card account, or combinations thereof, can be transmitted to the student loan holder profile for tracking the student loan holder's purchases of products and/or services using global positioning services (GPS), near field communication, or combinations thereof.

In an embodiment, the student loan repayment method can include computer instructions in the data storage for identifying a client device of a student loan holder without the student loan holder needing to input client device information.

In an embodiment, the student loan repayment method can include using computer instructions in the data storage for: receiving and storing the information associated with purchases of products or services from the debit card account, the credit card account, or combinations thereof; using the information associated with purchases of products or services to form a purchasing pattern, saving the purchasing pattern in the student loan holder profile, and presenting the purchasing pattern to the client device; and comparing current purchases of products or services made using the debit card account, the credit card account, or combinations thereof to previous purchases of products or services in the purchasing pattern using a predefined window of time.

The student loan repayment method can also include using computer instructions for: computing an amount of money repaid by the student loan holder by not purchasing a product or service that the student loan holder previously purchased, and presenting the amount of money repaid to the client device; computing an amount of money repaid by the student loan holder by purchasing a lower priced product or service than a related product or service within the purchasing pattern, and presenting the amount of money repaid to the client device; and combinations thereof.

In an embodiment, the student loan repayment method can include using computer instructions in the data storage to automatically deposit a preset amount of money into the account for accumulating money each time the debit card account, the credit card, or combinations thereof, is used for purchases, refunds, or combinations thereof.

In an embodiment of the student loan repayment method, the student loan holder profile can include: a name of the student loan holder; educational institution identification number; a social security number of the student loan holder; a tax identification number of the student loan holder; an address of the student loan holder; a phone number of the student loan holder; an email address associated with the student loan holder; client device identifiers; personal identification number (PIN); a security question to the student loan holder; and combinations thereof.

In an embodiment, the student loan repayment method can include computer instructions in the data storage that utilize the vector score to determine if the student loan holder prequalifies for a new student load or extension of a current student loan.

While these embodiments have been described with emphasis on the embodiments, it should be understood that within the scope of the appended claims, the embodiments might be practiced other than as specifically described herein.

What is claimed is:

1. A computer implemented method comprising: accumulating money to facilitate impulse saving as opposed to impulse spending by executing instructions partially resident on a student loan administrative server connected to a network, using an administrative processor and an administrative data storage and partially resident on a client device having a client processor and a client data storage of a student loan holder with student loans accessible through the network by:
   a. executing computer instructions in the client device to log into a student loan administrative server connected via the network;
   b. executing computer instructions in the client device for the student loan holder to log in to the software program product which is partially resident in a computing cloud, or in the student loan administrative server not in the computing cloud, or combinations thereof; and partially resident on the client device using: a preexisting social media identifier and a preexisting social media password or a preexisting third party site identifier and a preexisting third party password;
   c. executing computer instructions in the client device for the student loan holder to use a link to a social media service associated with the preexisting social media identifier and the preexisting social media password via the network or executing computer instructions in the client device for the student loan holder to use a link to a third party service associated with the preexisting third party site identifier and the preexisting third party password via the network;
   d. executing computer instructions in the administrative data storage to either link to the social media service or the third party service and import a student loan holder profile therefrom into the software program product or executing computer instructions in the client device for the student loan holder to create the student loan holder profile for transmission to the student loan administrative server;
   e. executing computer instructions in the client device for the student loan holder to create a login with a student identifier and a new password;
   f. executing computer instructions in the client device for the student loan holder to create an account for accumulating money and link the account for accumulating money to the student loan holder profile, wherein the student loan holder profile is stored in the client device application, a cloud data storage, or combinations thereof;
   g. executing computer instructions in the administrative data storage to receive financial information from the student loan holder in the student loan holder profile and linking the account for accumulating money to a financial account;
   h. executing computer instructions in the administrative data storage or the client device for the student loan holder to transfer money from the financial account into the account for accumulating money at the time a non-spending decision is made;
   i. executing computer instructions in the administrative data storage or the client device for the student loan holder to insert at least one monetary goal into the student loan holder profile that specifies an amount of money to be accumulated by a certain date in the account for accumulating money;
   j. executing computer instructions in the administrative data storage to compute and present on the client device a monetary amount to be accumulated in the account for accumulating money per unit of time in order to reach the monetary goal, executing computer instructions in the administrative data storage to recalculate and present on the client device the monetary amount needing to be accumulated per unit of time in the account for accumulating money as cash is deposited in the account for accumulating money in order to reach the monetary goal; and
   k. executing computer instructions in the client device to electronically make or receive money deposits into the account for accumulating money at the time a non-spending decision is made or a monetary goal is achieved from sources comprising:
      (i) money from a gift card;
      (ii) money from a third party for achieving the monetary goal;
      (iii) money from the third party or another third party as an incentive or a rebate to the student loan holder upon purchasing of an item, service, or combinations thereof;
      (iv) money from a friend, a family member, or another party related to the student loan holder; or
      (v) combinations thereof;
   l. executing computer instructions in the client device to receive and store the information associated with purchases of products or services from the debit card account, the credit card account, or combinations thereof; using the information associated with purchases of products or services to form a purchasing pattern;
   m. saving the purchasing pattern in the student loan holder profile, and presenting the purchasing pattern to the client device;

n. comparing current purchases of products or services made using the debit card account, the credit card account, or combinations thereof to previous purchases of products or services in the purchasing pattern using a predefined window of time;
o. executing computer instructions in the client device to compute an amount of money saved by the student loan holder
   (i) by not purchasing a product or service that the student loan holder previously purchased, and presenting the amount of money saved to the client device;
   (ii) by purchasing a lower priced product or service than a related product or service within the purchasing pattern, and presenting the amount of money saved to the client device; and combinations thereof;
   (iii) by buying a lower priced product or service as a substitute for a higher priced product or service and to deposit an amount of money equivalent to the difference between the higher priced product or service and the lower price product or service;
   (iv) by buying a similar product or service with a rebate to be paid into the account for accumulating money;
   (v) by not buying a product or service and to deposit an amount of money equivalent to the product or service not purchased into the account for accumulating money; and transferring the computed amount of money at the time the non-spending decision is made into the account for accumulating money
p. executing computer instructions in the cloud data storage or the administrative data storage of the client device to generate a bill paying prompt displayed via the client device comprising at least one of:
   1. saving an amount of money while paying a bill or saving on a fee associated with the bill;
   2. paying a bill early and initiating a transfer of an amount of money equivalent to a late fee or a finance charge into the account for accumulating money, wherein the late fee or the finance charge is associated with paying the bill late;
   3. paying a bill early to raise the student loan holder's credit score;
   4. cease purchasing products or services not being fully utilized;
   5. purchasing a lower priced alternative associated with a bill; or
   6. combinations thereof; and
transferring the computed amount of money at the time the non-spending decision or bill-paying occurs into the account for accumulating money wherein the non-spending decision is an action performed by the student loan holder to change a purchasing behavior in response to a context of a presented prompt;
q. executing computer instructions in the cloud data storage or the administrative data storage to present progress in saving cash towards the monetary goal as a digital graphical display, a pie chart, a bar graph, a chart, a table, a graph, a visual display of a monetary goal indicator, or combinations thereof;
r. executing computer instructions in the cloud data storage or the administrative data storage to provide a notification to the client device when, during a predefined time period, the account for accumulating money has not received cash deposits sufficient to accumulate the monetary amount of the monetary goal to be accumulated by a certain date; and
s. executing computer instructions in the cloud data storage or the administrative data storage for the student loan holder to request a comparison of the student loan holder's progress towards the student loan holder's monetary goal to other student loan holders' progress towards their monetary goal or a plurality of monetary goals, and present the comparison to the client device.

2. The method of claim 1, further comprising connecting with the cloud data storage or the administrative data storage to execute computer instructions to:
   a. allow the student loan holder to select the financial account from a plurality of accounts for transferring deposits of money into the account for accumulating money;
   b. provide a notice to the client device to allow the student loan holder to verify initiation of fund transfers, deposits, or combinations thereof; and
   c. display on the client device at least one of:
      (i) deposits made within a preset period of time;
      (ii) a total amount of money accumulated to date;
      (iii) a record of each deposit made into the account for accumulating money; and
      (iv) a time and date for each deposit made into the account for accumulating money.

3. The method of claim 1, further comprising executing computer instructions in the cloud data storage or the administrative data storage to present to the client device a member of a group consisting of:
   a. a welcome screen;
   b. a make a deposit button for actuating computer instructions to enable the student loan holder to select the make a deposit button to initiate deposits into the account for accumulating money;
   c. a check my balance button for executing computer instructions to display a current balance in the account for accumulating money along with a progress towards the monetary goal;
   d. a transfer destination selector for executing computer instructions to enable the student loan holder to identify a transfer destination for receiving transfers of money from the account for accumulating money;
   e. a transfer amount selector for executing computer instructions to enable the student loan holder to select a monetary amount to be transferred from the account for accumulating money to the transfer destination;
   f. a transfer now button for executing computer instructions to transfer all or portions of the money in the account for accumulating money to the transfer destination; and
   g. combinations thereof; and
      the transfer destination is an account with a financial service company, a bank account, a brokerage firm account, a mutual fund, a checking account, a savings account, or combinations thereof.

4. The method of claim 1, further comprising executing computer instructions in the cloud data storage or the administrative data storage to store and present an agreements screen from a library of agreements to the student loan holder using the client device, wherein an agreement from the library of agreements includes at least one of:
   a. a signup agreement for the student loan holder to obtain a license to use the software program product which is partially resident in the computing cloud, or partially resident in the administrative server, and partially resident on a client device for the account for accumulating money;
   b. an account linking agreement that links a financial institution, a third party, or combinations thereof to the account for accumulating money;

c. an employer-employee agreement that allows a direct deposit service to deposit money into the account for accumulating money;
d. a social media agreement that links the social media service to the software program product and the account for accumulating money; and
e. combinations thereof.

5. The method of claim 1, further comprising executing computer instructions in the cloud data storage or the administrative data storage to present celebration indicators to the client device when the student loan holder achieves at least one goal, including a member of the group comprising: an animated graphical display, words of praise, words of support, an audio indicator, a visual indicator, a textual indicator, or combinations thereof.

6. The method of claim 1, further comprising executing computer instructions in the cloud data storage or the administrative data storage to periodically provide a savings tip to the client device for viewing by the student loan holder on how to save money.

7. The method of claim 1, further comprising executing computer instructions in the cloud data storage or the administrative data storage to link the student loan holder to the social media service through the network to share information.

8. The method of claim 1, further comprising executing computer instructions in the cloud data storage or the administrative data storage to create a vector based score from deposit information in the student loan holder profile, goal information in the student loan holder profile, and progress information in the student loan holder profile to rank the student loan holder relative to other student loan holders and present the vector based score to the client device.

9. The method of claim 8, further comprising executing computer instructions in the data storage that utilize the vector score to determine if the student loan holder prequalifies for a new student loan or extension of a current student loan.

10. The method of claim 1, further comprising executing computer instructions in the cloud data storage or the administrative data storage to provide encouragement at random intervals or preset intervals to the client device.

11. The method of claim 1, further comprising executing computer instructions in the cloud data storage or the administrative data storage to enable third parties to provide offers to the student loan holder comprising a member of the group: rebates, starting bonuses, and incentives.

12. The method of claim 1 further comprising executing computer instructions in the cloud data storage or the administrative data storage for:

a. receiving and storing the information associated with purchases of products or services from a debit card account, a credit card account, or combinations thereof;
b. using the information associated with purchases of products or services to form a purchasing pattern, saving the purchasing pattern in the student loan holder profile, and presenting the purchasing pattern to the client device; and
c. comparing current purchases of products or services made using the debit card account, the credit card account, or combinations thereof to previous purchases of products or services in the purchasing pattern using a predefined window of time, and performing a member of the group comprising:
  (i) computing an amount of money saved by the student loan holder by not purchasing a product or service that the student loan holder previously purchased, and presenting the amount of money saved to the client device;
  (ii) computing an amount of money saved by the student loan holder by purchasing a lower priced product or service than a related product or service within the purchasing pattern, and presenting the amount of money saved to the client device; and
  (iii) combinations thereof.

13. The method of claim 12, further comprising executing computer instructions in the cloud data storage or the administrative data storage to automatically deposit a preset amount of money into the account for accumulating money each time the debit card account, the credit card account, or combinations thereof is used for purchases, refunds, or combinations thereof.

14. The method of claim 1, wherein the student loan holder profile comprises:
a. a name of the student loan holder;
b. educational institution identification number;
c. a social security number of the student loan holder;
d. a tax identification number of the student loan holder;
e. an address of the student loan holder;
f. a phone number of the student loan holder;
g. an email address associated with the student loan holder;
h. client device identifiers;
i. personal identification number (PIN);
j. a security question to the student loan holder; and
k. combinations thereof.

* * * * *